US008380241B2

(12) United States Patent
McGary et al.

(10) Patent No.: US 8,380,241 B2
(45) Date of Patent: *Feb. 19, 2013

(54) COMMUNICATION ASSISTANCE SYSTEM AND METHOD WITH PROSPERITY MARKETING

(75) Inventors: Faith McGary, Bethlehem, PA (US); Christine Baumeister, Schwenksville, PA (US); Robert Pines, New York, NY (US)

(73) Assignee: Grape Technology Group, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/888,727

(22) Filed: Sep. 23, 2010

(65) Prior Publication Data

US 2011/0223897 A1 Sep. 15, 2011

Related U.S. Application Data

(63) Continuation of application No. 11/805,839, filed on May 24, 2007, now Pat. No. 7,869,825, which is a continuation-in-part of application No. 11/416,397, filed on May 1, 2006, now Pat. No. 7,711,354.

(60) Provisional application No. 60/808,236, filed on May 24, 2006.

(51) Int. Cl.
*H04M 1/00* (2006.01)

(52) U.S. Cl. ............ 455/550.1; 455/418; 455/426.1; 707/999.01; 379/218.01

(58) Field of Classification Search ............ 455/550.1, 455/418, 426.1; 707/3, 999.01; 709/201; 379/28.011
See application file for complete search history.

(56) References Cited

U.S. PATENT DOCUMENTS

| 5,850,433 | A | 12/1998 | Rondeau |
|---|---|---|---|
| 6,335,966 | B1 * | 1/2002 | Toyoda ............... 379/100.06 |
| 6,606,744 | B1 | 8/2003 | Mikurak |
| 6,754,217 | B1 * | 6/2004 | Ahn ..................... 370/395.6 |
| 7,007,029 | B1 * | 2/2006 | Chen ............................ 1/1 |
| 2004/0184593 | A1 | 9/2004 | Elsey et al. |
| 2005/0100153 | A1 | 5/2005 | Pines et al. |
| 2005/0176366 | A1 * | 8/2005 | Levy ....................... 455/3.06 |
| 2006/0178161 | A1 * | 8/2006 | Jung ......................... 455/518 |
| 2007/0177548 | A1 * | 8/2007 | Oyama et al. ............. 370/331 |
| 2009/0276398 | A1 * | 11/2009 | Naganuma et al. ........... 707/3 |

FOREIGN PATENT DOCUMENTS

| WO | 03058926 | 7/2003 |
|---|---|---|
| WO | 2004049130 | 10/2004 |

OTHER PUBLICATIONS

Ryder Joan M et al. 'Cognitive Engineering of a New Telephone Operator Workstation Using COGNET'. In international journal of industrial ergonomics, 1998.
International Search Report dated Mar. 5, 2008.
International Search Report dated Oct. 19, 2012.

* cited by examiner

*Primary Examiner* — Danh C Le
(74) *Attorney, Agent, or Firm* — Sofer & Haroun, LLP

(57) ABSTRACT

A communication assistance system includes a database having a plurality of listings therein, each of the listings includes a least one contact name and a contact information. A means is provided for receiving incoming communications from a plurality of requesters seeking a listing. A table stores past requested listings of the requesters, where the system reviews the table for storing past requested listings and, based on contents contained in the past requested listing table, develops a list of requesters to target a promotion to, whereupon when a requester who is among the list of requesters contacts the system, they are provided with the promotion.

14 Claims, 9 Drawing Sheets

INCOMING CALL INFORMATION RECORD 15

| NUMBER DIALED BY REQUESTER | PREFERRED LANGUAGE CODE FIELD | ORIGINATING PHONE NUMBER OF REQUESTER | REQUESTER SERVICE PROVIDER FIELD | FEATURE CODE |
|---|---|---|---|---|

FIG. 2

CALL COMPLETION DATA PACKET 50

| | |
|---|---|
| 54 | • ORIGINATING PHONE NUMBER OF REQUESTER FIELD |
| 56 | • DEVICE IDENTIFICATION INFORMATION FIELD |
| 58 | • CLOSING PROMPT CODE FIELD |
| 59 | • PRE-ANNOUNCEMENT FIELD |

FIG. 5

PAST REQUESTED LISTING TABLE 92

| REQUESTER PHONE NUMBER | LISTING REQUESTER | LAST REQUESTED TIME AND DATE | COUNTER | CATEGORY | CATEGORY RANK |
|---|---|---|---|---|---|
| | LISTING A NAME, ADDRESS, PHONE NUMBER | MM/DD/YYYY HH:MM | 2 | RESTAURANT | 3 |
| | LISTING B NAME, ADDRESS, PHONE NUMBER | MM/DD/YYYY HH:MM | 3 | PERSONAL CONTACT | 2 |
| | LISTING C NAME, ADDRESS, PHONE NUMBER | MM/DD/YYYY HH:MM | 2 | PERSONAL CONTACT | 3 |
| | LISTING D NAME, ADDRESS, PHONE NUMBER | MM/DD/YYYY HH:MM | 5 | RESTAURANT | 1 |
| | LISTING E NAME, ADDRESS, PHONE NUMBER | MM/DD/YYYY HH:MM | 8 | MOVIES | 2 |
| | LISTING F NAME, ADDRESS, PHONE NUMBER | MM/DD/YYYY HH:MM | 4 | RESTAURANT | 2 |
| | LISTING G NAME, ADDRESS, PHONE NUMBER | MM/DD/YYYY HH:MM | 6 | PERSONAL CONTACT | 1 |
| | LISTING H NAME, ADDRESS, PHONE NUMBER | MM/DD/YYYY HH:MM | 10 | MOVIES | 1 |
| | LISTING I NAME, ADDRESS, PHONE NUMBER | MM/DD/YYYY HH:MM | 1 | RESTAURANT | 4 |
| | LISTING J NAME, ADDRESS, PHONE NUMBER | MM/DD/YYYY HH:MM | 2 | MOVIES | 3 |
| | LISTING K NAME, ADDRESS, PHONE NUMBER | MM/DD/YYYY HH:MM | 1 | PERSONAL CONTACT | 4 |

| Personal Information 95 | Random Field 97 |
|---|---|

FIG. 6

TOP REQUESTED LISTINGS SUB-TABLE 94

REQUESTER PHONE NUMBER

| RESTAURANTS RANK | COUNTER | MOVIES RANK | COUNTER | PERSONAL CONTACTS RANK | COUNTER | 1-800 NUMBERS | HOTELS |
|---|---|---|---|---|---|---|---|
| 1. LISTING D NAME, ADDRESS, PHONE NUMBER | 5 | 1. LISTING H NAME, ADDRESS, PHONE NUMBER | 10 | 1. LISTING G NAME, ADDRESS, PHONE NUMBER | 6 | 1 | 1 |
| 2. LISTING F NAME, ADDRESS, PHONE NUMBER | 4 | 2. LISTING B NAME, ADDRESS, PHONE NUMBER | 8 | 2. LISTING B NAME, ADDRESS, PHONE NUMBER | 3 | 2 | 2 |
| 3. LISTING A NAME, ADDRESS, PHONE NUMBER | 2 | 3. LISTING J NAME, ADDRESS, PHONE NUMBER | 2 | 3. LISTING C NAME, ADDRESS, PHONE NUMBER | 2 | 3 | 3 |
| 4. LISTING I NAME, ADDRESS, PHONE NUMBER | 1 | 4. | | 4. | | 4 | 4 |
| 5. | | 5. | | 5. | | 5 | 5 |

FIG. 6A

COMMUNICATION ASSISTANCE SYSTEM AND METHOD WITH PROSPERITY MARKETING

RELATED APPLICATION

This application is a continuation of U.S. patent application Ser. No. 11/805,839, filed on May 24, 2007, now issued as U.S. Pat. No. 7,869,825 on Jan. 11, 2011, which is a C-I-P of co-pending U.S. patent application Ser. No. 11/416,397 filed on May 1, 2006 and also claims priority to U.S. Provisional Patent Application No. 60/808,236, filed on May 24, 2006, the entirety of which are incorporated by reference herein.

FIELD OF THE INVENTION

The present invention is directed to a system and method, which allows a requester to contact a communication apparatus user, and, in particular, to a system and method which stores and prioritizes past requested listings from a particular requester.

DESCRIPTION OF THE RELATED ART

One drawback of current directory assistance systems arises when a requester using the system frequently requests the same information or listing. In such situations in the present directory assistance systems, the operator needs to input the search criterion each time the requester makes the request. In this configuration, a directory assistance operator may be called on to retrieve the same directory listings several times for the same requester over a period of time. This leads to a wasteful use of operator time as well as leading to frustration on the part of the requester who is frequently requesting the same listing information.

As a result, it is desirable to have a system and method, which permits a more efficient acquisition of data by a directory assistance operator when a requester frequently requests the same information listing. It is also desirable to create a system capable of meaningfully utilizing the frequently requested listings so as to decrease the listing retrieval time when frequently requested listings are asked for again. With the advancements in the technology used for wireless, remote devices, such as cellular phones and PDAs, and the networks that support them, there is also a need to be able to synchronize data between the held device and the directory assistance provider so that both can have ready access to frequently called numbers.

SUMMARY OF THE INVENTION

The present invention advantageously provides a system and method which facilitates the efficient acquisition of data by a directory assistance operator when a requester frequently requests the same information listing. The system is capable of meaningfully utilizing the frequently requested listings by storing and manipulating the past requested listings of a given requester and organize and present them to the operator in such a way so as to decrease the listing retrieval time when frequently requested listings are asked for again.

To this end, a directory assistance system for either land line or wireless listings employs a requester listing table which tracks a requester's phone number and the time and date of the requester's request. When a listing is solicited the information is stored in the requester listing table, populated by information provided by the directory assistance system. After the requester makes a call to make a request for a listing and prior to the operator searching for the listing, the directory assistance system searches a past requested listing table to see if there is a match on the requester phone number. If so, then the past requested listings are presented to the operator displaying the requesters phone number, the past requested listings and time and date information associated with those listings. If the current listing being requested by the requester is on the screen, the operator can bypass searching for the listing and instead can directly transfer the requester to the desired listing thereby saving time for both the operator and the requester.

The past requested listing table is further configured to tabulate the categories of the stored listings. Such categories may include but is not limited to recreational, movies, restaurants, commercial stores, 1-800 numbers, airlines, hotels, taxis and personal numbers. The category designations may be utilized directly on the past requested listing table or alternatively a top requested listing sub-table 94 may be provided that further organizes the stored listings by their respective categories and the number of times they were requested facilitating faster connection of the requester to the desired listing.

It is another object of the present invention to provide a communication assistance system having a database with a plurality of listings therein, each of which includes at least one contact name and a contact information. A means is provided for receiving incoming communications from a plurality of requesters seeking a listing.

Past requested listings of the requesters are stored in a table, where the system reviews the table for storing past requested listings and, based on contents contained in the past requested listing table, developing a list of requesters to target a promotion to, whereupon when a requester who is among the list of requesters contacts the system, they are provided with the promotion.

BRIEF DESCRIPTION OF THE DRAWINGS

FIG. 2 is a field diagram describing the structure of an incoming call information record in accordance with one embodiment;

FIG. 5 is a field diagram of a call completion data packet in accordance with one embodiment;

FIG. 6 illustrates a past requested listing table in accordance with one embodiment;

FIG. 6A illustrates a top ranked listing table in accordance with one embodiment;

DETAILED DESCRIPTION OF EMBODIMENTS OF THE INVENTION

Figure 1:
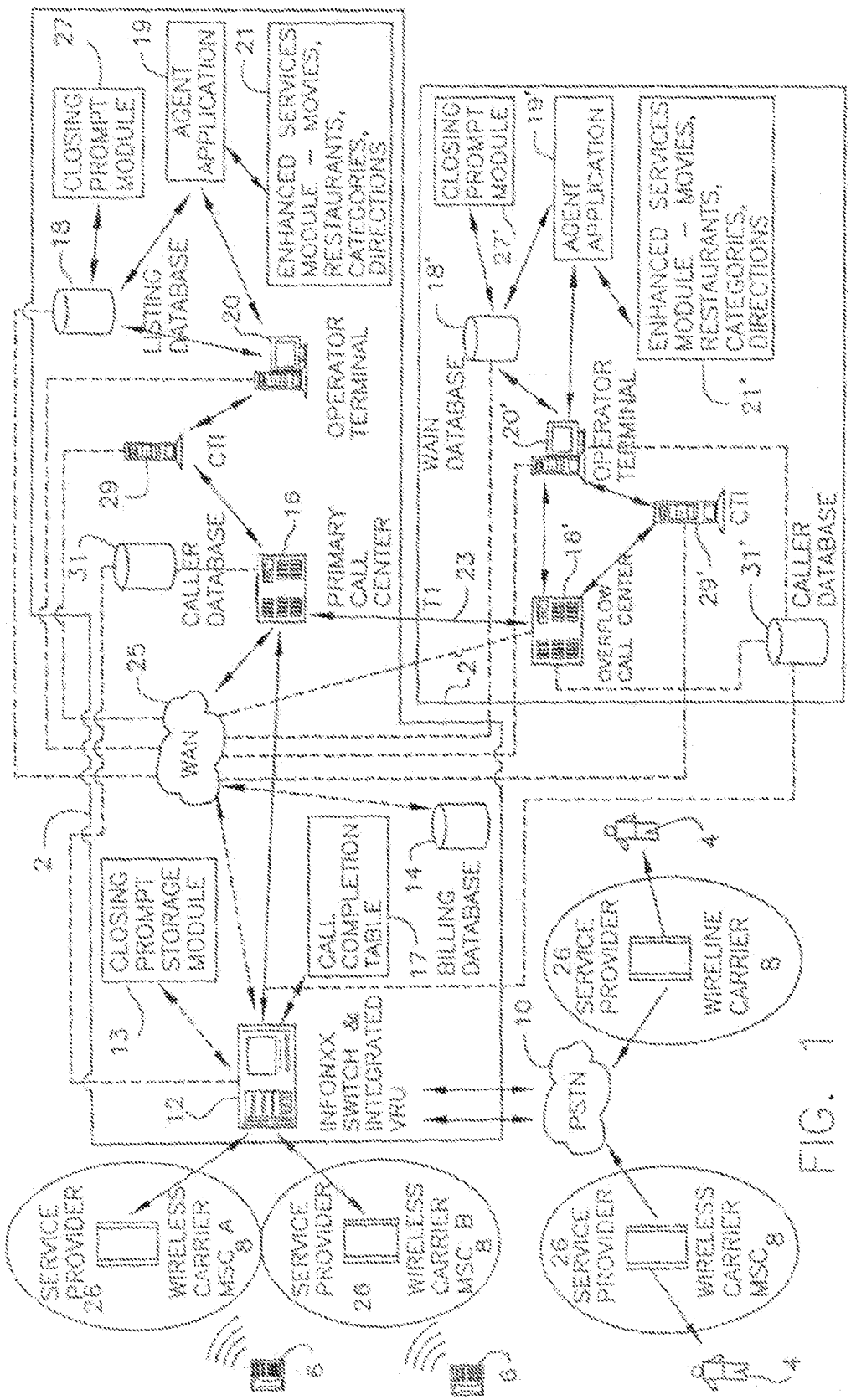
FIG. 1 is a diagram of a communication assistance system of the present invention in accordance with one embodiment.

Referring now to the drawings, wherein like reference numerals refer to like elements, there is shown in FIG. 1, a communication assistance system 2 in accordance with one embodiment of the present invention. System 2 allows a requester 4 to initiate communications with device 6, even where requester 4 does not know the identification number of device 6. Device 6 refers to a device used by a subscriber to a wireless or wireline service, and will be used throughout the application to refer to the device that the requester 4 intends to reach. Requesters 4 can access system 2 via a traditional wireline Local Exchange Carrier (LEC) and/or Inter-Exchange Carrier, via a wireless carrier (including both voice and data access) or via connection to the Internet. Devices 6 can be any known communication device including cellular telephones and modems, pagers, PCS phones and modems, RIM Blackberry, wireless PDA, instant messaging devices, SMS devices and the like.

It is contemplated that the present invention can be implemented to accommodate any device including land line phones, business phones and Personal Digital Assistant (PDA) with voice communication capability, etc.

Subscriber 6 refers to any individual or business entity, whose information is stored for retrieval by the system. Although FIG. 1 depicts such subscribers using wireless devices it is appreciated that any communication information relating to subscriber 6 such as their landline phone number, pager number, e-mail address, etc. can be stored and retrieved by the system. Also, for the purposes of illustration, requester 4 refers through out to a requester 4 that accesses system 2 to seek the information. It is important to note that a repeat requester 4 may be invited by system 2 to provide their information into system 2 and thus be incorporated into a database containing searchable subscriber 6 listings.

Communication assistance system 2 is preferably coupled to one or more service providers 26 directly through wireless MSC (Mobile Switching Center) 8 or via public switched telephone network (PSTN) 10.

In general, device 6 communicates with system 2 via Mobile Switching Center (MSC)s 8 as shown in FIG. 1. Although not shown, it is contemplated that device 6 can communicate with system 2 via a MSC 8 coupled to PSTN 10.

As shown in FIG. 1, system 2 is preferably comprised of one or more switches and integrated voice response units (VRU) 12 (the VRU may be standalone instead of integrated as described above), billing databases 14, primary call centers 16, listing databases 18 and a plurality of operator terminals 20 running agent application 19 accessing enhanced service modules 21 that may be operated by an agent, closing prompt storage module 13, call completion table 17, a Wide Area Network 25 (WAN), closing prompt modules 27 coupled to agent applications 19, a Computer Telephony Interfaces 29 (CTI) and a caller database 31. In particular, billing database 14 is connected to WAN 25 and can be coupled to any component of system 2. Units 12 are coupled to Mobile Switching Centers (MSCs) 8 and PSTN 10 as well as primary call center 16. Primary call center 16 is also coupled to at least one operator terminal 20 and listing database 18.

The connection between primary call center 16 and operator terminal 20 is such that voice communication is transmitted directly between the two and data information is transmitted via computer telephony interface 29. This may also be accomplished via in-band signaling, as will be discussed below. Operator terminal 20 is not only connected to the listing database 18 but also to other databases and software application modules as well.

In a preferred embodiment of the present invention a plurality of call centers such as system 2 and system 2', illustrated in FIG. 1, can be strategically located in various geographic locations across the country. For example, each call center, system 2 or system 2' can be located in a major metropolitan area spread across the United States. Each call center is configured to handle the call traffic that is designated for that call center which could include all possible type of calls.

In operation, primary call center 16' receives forwarded calls from primary call center 16 in the case where system 2 is experiencing operational problems or a volume of requests that exceed its capacity. In addition, it is possible through intelligent pre-routing within the network to automatically deliver the call to primary call center 16'. An important benefit provided by this arrangement is that the primary call center 16' of system 2' is able to act as an overflow unit for primary call center 16 of system 2 in the event that system 2 is experiencing technical difficulties or high call volume. This configuration allows primary call center 16 to route calls to primary call center 16' during periods of high volume, even in the event of a breakdown in the primary direct connections of system 2 as described above.

Another component of system 2 or 2' is call completion table 17. Call completion table 17 allows switch 12 to select an outbound trunk group that can most efficiently route the call to the end destination. For example, if requester 4 requests a traditional directory assistance listing (i.e. a wireline business or residential listing), service provider 26 of requester 4 may prefer to complete these calls on their own network. In this case call completion table 17 would select an outbound trunk group to service provider 26 of requester 4. In the case where requester 4 requests a listing of a device 6, it may be more desirable to complete the call via the network of the service provider 26 of the device 6. In this case call completion table 17 would select a direct outbound trunk group to service provider 26 of device 6.

Call completion table 17 also allows for the programming of multiple outbound routes for each call depending on, but not limited to, the time of day, the service provider 26 of the requester 4, the service provider 26 of device 6, corresponding rates for each service provider 26 and time of the day and the NPA/NXX of the destination.

Figure 3:
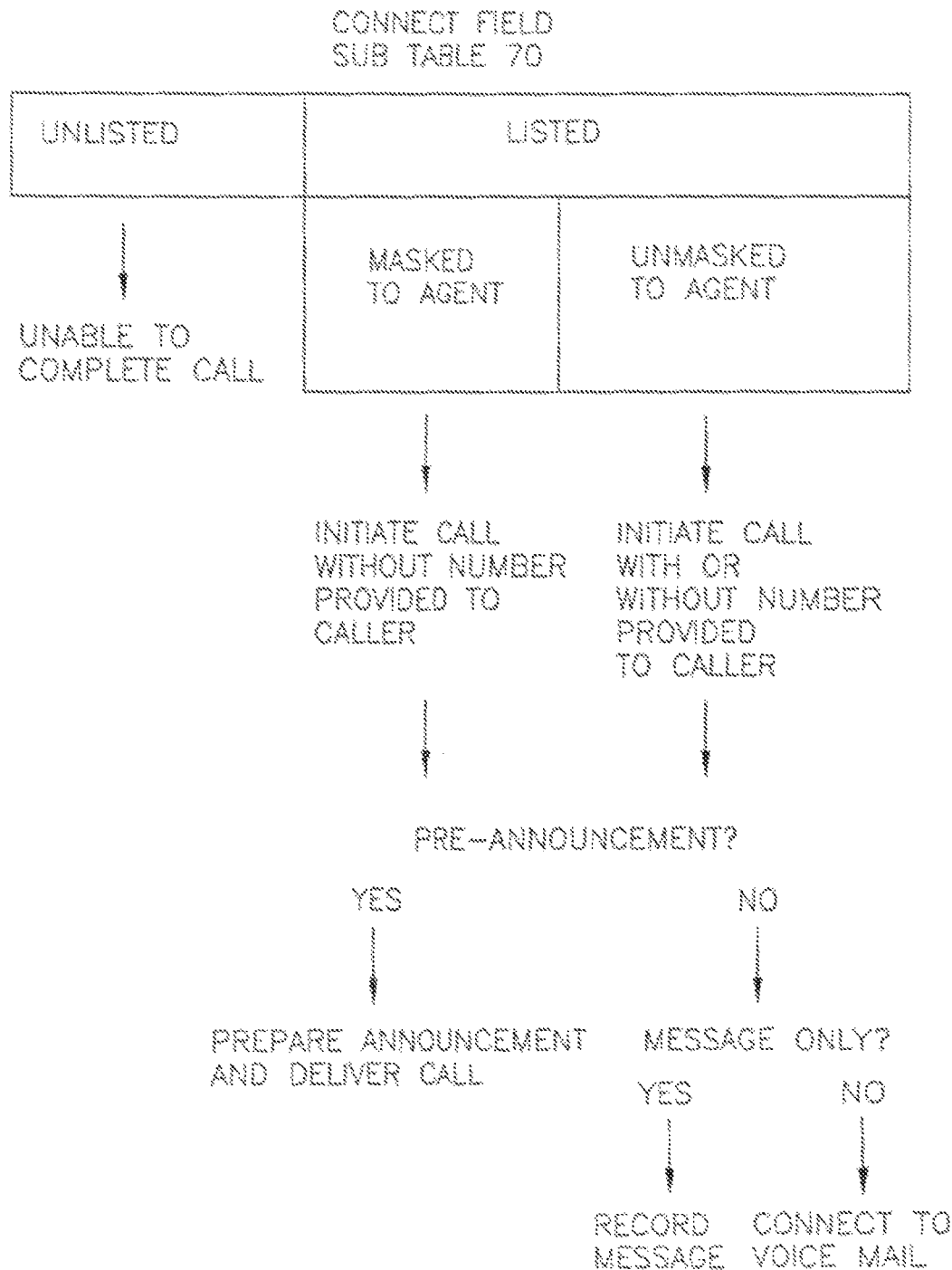
FIG. 3 is a field diagram of the Connect Field of a listing table in database 18 in accordance with one embodiment.

Listing database 18 and listing database 18' are similarly arranged, and are preferably mirror images of one another. Although operator terminal 20 is not shown directly coupled to primary call center 16' and listing database 18', operator terminals 20 can be so coupled via WAN 25, or can access call center 16' and database 18' via primary call center 16 as shown in FIGS. 1, 2 and 3. This overcomes situations where database 18 is down in system 2, such that operator terminal 20 completes the call using information stored on database 18'.

The links coupling the various components of system 2 together and with service providers 26 via Mobile Switching Center (MSC) 8 and Public Switched Telephone Network (PSTN) 10 can be any known voice and/or data communication technologies, including wide area networking and local area networking communication technologies, for example, digital subscriber lines (DSL), digital T-1s, leased lines, satellite or wireless links, Integrated Services Digital Network (ISDN) circuits, asynchronous transfer mode (ATM), Ethernet, token ring, fiber distributed-data interface (FDDI) and the like. It is also presumed that the various components of system 2, service providers 26 and PSTN 10 are arranged with appropriate communication hardware interfaces to transmit and receive data across the communication links.

For example, wireless service providers 26 may interface directly with system 2 via Mobile Switching Center (MSC) 8 hardware coupled directly to Switch 12 of system 2. Switches 12 can be any switches that preferably include an integrated voice response unit. Many functions performed by switches 12 are known to those of ordinary skill in the art and include telephone call routing between trunks, converting one signaling type to another, such as between a digital signaling system, dual-tone multi-frequency (DTMF) signaling, multi-frequency (MF) signaling, ISDN, SS7, etc., and capturing call length and destination data for billing, etc.

As shown in FIG. 1, when a call comes into Switch 12, the call is identified by a DNIS which relates to the number dialed by the requester, so that appropriate data generated by system 2, such as call completion data packets 50 (FIG. 5), can be routed to the correct switch 12 to complete the call, as will be explained in more detail hereinafter.

As shown in FIG. 1, a closing prompt storage module 13 is configured to store a variety of closing prompt messages and data, such that when the switch 12 completes the call from requester 4 to device 6, switch 12 can play any one of a variety of closing prompts based on the information received from a call completion data packet 50 as will be explained in more detail. Although only one switch 12 is illustrated in FIG. 1, any number of switches 12 can be used in system 2 to increase the capacity of system 2.

FIG. 2 illustrates an Incoming call information record 15 provided by switch 12, after switch 12 receives a call from requester 4, record 15 is sent to primary call center 16.

In accordance with one embodiment of the present invention, Incoming call information record 15 contains a number of fields which may include but is not limited to: number dialed by requester field, preferred language code field, originating phone number of requester field and requester service provider field and feature code field.

The number dialed by requester field contains the number dialed by requester 4 and may be used to identify the originating switch location of the incoming call.

The preferred language code field contains information indicating the language preference of requester 4. System 2, and in particular switch 12, maintains the ability to translate many different dial strings into system 2. One possibility for determining the preferred language of requester 4 is to automatically route calls from a particular dialed number, for example NPA-555-1818, directly to, for example, Spanish speaking operators. Another possibility is to route the call using information stored on the caller database 31. The preferred language code field is used to route calls to primary call center 16 via switch 12 by way of incoming call information record 15.

The originating phone number of the requester field holds the originating phone number of the requester 4. The requester service provider field conveys the service provider of requester 4. This field allows system 2 to identify the calling party's service provider 26 for use with various functions such as introduction prompts, closing prompts, billing information, usage tracking, etc. One example of a use of this data is to allow for the settlement of billing charges between the service provider 26 of requester 4 and service provider 26 of device 6.

The feature code field holds information that can be used to identify any special features associated with requester 4's device. These features could include, but are not limited to: promotional rate plans, standard rate plans, bundled service plans, device capabilities and the like. For example, service provider 26 may offer unlimited directory assistance for a flat fee per month, or could offer services free for a promotional period.

Although only five fields are identified for incoming call information record 15, any number of fields that are used to provide system 2 with the necessary data to complete a call is within the contemplation of this invention.

As shown in FIG. 1, billing database 14 is used as the repository for the billing data and includes but is not limited to: records which are preferably comprised of the call date, the call start time, the call end time and the resulting time, i.e. the call length, the originating phone number for requester 4, the listing information for device 6 and fields which identify the originating and terminating service providers. The billing data can be accumulated from any of, but not limited to, the following: switches 12, ACDs, PBXs, agent application 19 and/or database 18.

Call centers 16 and 16' are comprised of hardware and software which accept inbound calls from switches 12 and which distribute the calls to multiple operator terminals 20 using standard Automatic Call Distribution (ACD) technology. Operator terminal 20 interacts with database 18 to search for and retrieve a listing corresponding to device 6. The search can be done using a single field or combination of fields in the listing entry.

Call center 16 and 16' can be comprised of one or more processors coupled together in a networked arrangement to accomplish these functions, and can be constructed using known computing technology such as using personal computers, mini or mainframe computing devices, routers, switches and the like. Because the arrangement and operation of call centers 16 and 16' are similar, discussion of primary call center 16 is understood to also describe primary call center 16'.

Computer Telephony Interface (CTI) 29 is disposed between call center 16 and operator terminal 20. CTI 29 is configured to route the data portion of an incoming requester 4 call; such as the number dialed by the requester and the originating phone number of the requester to operator terminal 20, while the voice portion of the call is transmitted directly between call center 16 and operator terminal 20. While not discussed here, it is contemplated within the context of this invention that the data portion of an incoming requester 4 call could be sent to operator terminal 20 using in-band signaling (i.e., with the voice path of the call) as well.

Operator terminal 20 can also be any known computing device capable of receiving and displaying data on its display, including but not limited to a personal computer, UNIX workstation and the like. Although it is preferred that a separate customer service representative telephone be implemented as part of system 2 and coupled to primary call center 16 for communicating with requester 4, operator terminal 20 is not limited to this arrangement. For example, operator terminal 20 can be arranged to contain an integrated telephone (as shown). In other words, any arrangement that allows a customer service representative to engage in oral communications with requester 4 is sufficient. In addition, although only a single operator terminal 20 is shown, system 2 is not limited to this arrangement. It is contemplated that system 2 is comprised of multiple operator terminals 20 such that more than one customer service representative is available to accommodate the users of system 2. It should be noted that primary call center 16 and its communication with switches 12, operator terminal 20 and database 18 as well as the arrangement and communication between primary call center 16' and switches 12' can be implemented in accordance with the connectivity and communication techniques described in U.S. Pat. No. 6,404,884 issued on Jun. 11, 2002, the contents of which are incorporated herein by reference. In an alternate embodiment of this invention it is contemplated that a requester 4 may interact with an agent using a non-voice method such as, but not limited to: Short Messaging Service (SMS), Wireless Application Protocol (WAP), live chat, and instant messaging as will be discussed below.

Agent application 19 platform is used to operate operator terminals 20 and databases 18. This system not only supports the communications between these modules but also prepares a call completion data packet 50 that is to be sent to switch 12 to ultimately complete the call.

To create call completion data packet 50, operator terminal 20 and agent application 19 require information to be retrieved from database 18. This data is used to populate the various fields of call completion data packet 50 as discussed in more detail below.

Listing database 18 is preferably any known database system which can be programmed to store all of but not limited to the following: wireline telephone directory listings, originating service provider 26 of requesters 4 listings, wireless listings and other listings such as providers of goods and services. Listing database 18 preferably supports multiple database tables for a voluminous quantity of listings and multimedia data associated with each user or organization that is sponsoring a group of users.

It should be noted that the present invention augments the database tables described in U.S. Pat. No. 6,404,884 by including several additional fields to support new features as discussed herein.

Listings database 18 can be based on any known database software and any known database format. The hardware configuration of listing database 18 can be any hardware platform capable of supporting the quantity of users and entries in their respective database tables. As such, listing database 18 can be stored on any device capable of storing the information.

Those of ordinary skill in the art can appreciate that although database 18 is shown as a single unit, it is not limited to this configuration. Database 18 can be comprised of multiple hardware units, i.e., central processing units and/or storage devices such as CD-ROMs, hard disk drives, tape disk drives, etc. which can communicate with each other across a transmission link. In addition, while only specific tables and fields within listing database 18 are discussed in detail, the current invention does not limit the table schema in listing database 18. In accordance with one embodiment of the present invention each database in system 2 or system 2' such as database 18 or 18' stores the same information. In an alternate embodiment, it is also contemplated that listing database 18 can take the form of a distributed database. For example, users who are primarily based on the west coast can be supported from a portion of database such as listing database 18' located in California, while users primarily located on the east coast can access a portion of database such as database 18 located in New York.

In one embodiment of the present invention, listing database 18 stores a branded audio message associated with the service provider 26 of the requester 4 such that when requester 4 accesses system 2, the audio welcome message is retrieved by operator terminal 20 and played to the requester 4. In another embodiment of the present invention the audio welcome message may be retrieved and played on call center 16 or switch 12. This welcome audio message is discussed in detail below.

Listing database 18 and 18' also contain a connect field as illustrated in FIG. 3. The connect field identifies the degree of availability of the listing for disclosure. The connect field consists of a connect field sub table listing 70, which categorizes a number first as either listed or unlisted. If a number is unlisted it cannot be used to complete a call. However if the number is listed, connect field sub table listing 70 is further subdivided into "unmasked to agent" or "masked to agent". In the case of "masked to agent", a call can be completed but requester 4 does not receive the number. In this case, the number or any portion thereof may be masked to the agent or customer service representative as well, such that the agent will not have access to the number, and the call is simply connected. In the case of "unmasked to agent", the subscriber for device 6 has authorized system 2 to reveal the number to the agent and/or requester 4 as would most likely be the case for business wireless devices.

It is important to note that in the event requester 4 requests a masked listing, when that listing is saved in accordance with the past requested listings features of the present invention, the masked listings will appear on such stored listings in the masked format as described in more detail in the operation section.

In another embodiment of the present invention, as illustrated in FIG. 6, a past requested listing table 92 is provided, and stored for example, in listing database 18. Table 92 is configured to store information from past requesters 4 and each requester's corresponding information concerning the requested listings. Past requested listing table 92 maintains a requester 4 call number field which relates to the incoming requester 4 number. This field is configured to associate past requested listings of a particular requester 4 so that system 2 can identify past requested listings based on individual requesters 4. Past requested listing table 92 is generated for each requester 4 as soon as they first contact system 2 and is maintained and updated with each additional call.

It should be noted that past requested listing table 92 is generated by system 2, stored in database 18, and utilized by operator terminal 20 as suggested above, however this is intended only as an example of one configuration to store table 92 and is in no way intended to limit the scope of the present invention.

For example, past requested listing table 92 may be stored in system 2 and operated directly at the wireless device used by requester 4 via service provider 26. In such a case, system 2 will generate and store past requested listing table 92 on a server and then transmit the list via an operable protocol to requester's 4 service provider 26 which in turn sends the list to the wireless device of requester 4.

In this configuration, table 92 may be operated via WAP (Wireless Application Protocol) or any other compatible protocol capable of interfacing with system 2 and communicating the desired listing to be connected to. This configuration provides even faster service for connection to the desired links in the event the desired listing is contained in past requested listing table and is particularly effective in wireless communication devices with memory sufficient to operate the necessary protocol to interface with system 2. This allows a requester 4 to search through past requested listing table 92 on their own wireless device after they turn on their device and the list is updated by system 2 as discussed in more detail below.

Past requested listing table 92 also maintains a listing requested field which corresponds to the subscriber 6 information requested by a particular requester 4. The listing time and date field, associated with the listing requested field, stores the last time and date that a listing was requested. A counter field is also maintained, associated with requested listing field, tracking the number of times that a particular listing was requested by a requester 4.

In one embodiment of the present invention, past requested listing table 92 is configured to store past requested listings for a set amount of time with the presumption that numbers that have not been dialed for a long time are less likely to be requested again. For example, past requested listing table 92 may have a storage time frame of 90 days where each of the listings on table 92 have been requested at least once within the last 90 days by requester 4.

Furthermore, this time frame may be modified as the number of times a particular listing was requested. For example, the base time frame for past requested listing table 92 may be 90 days for listings requested once. However if a particular listing has been requested three times, past requested listing table 92 may hold this listing for 180 days with the expectation that this listing will be more likely to be requested again in the future than a listing that was only requested once.

Another possible method of altering the duration for which a particular listing is stored on past requested listing table 92, is to reset the 90 day storage period each time a listing is requested. In this configuration if a listing is requested a second time within the initial 90 day storage period the storage period is reset and the listing is stored for another 90 days. It is under stood that any number of possible storage designs are possible for the listings of past requested listing table 92 such that the table is effective at reducing the amount of time required by operator terminal 20 to reduce the time required to retrieve the desired listing.

In this respect, past requested listing table 92 is designed to maintain a number of the past requested listing for a particular requester 4 such that it provides the operator terminal 20 a number of past requested listings sufficient to expedite a number of requests without having to sift through an undue number of outdated listings.

One such standard for maintaining sufficient listings on past requested listing table 92 for a given requester 4 is to store enough listings such that approximately 20% of requester 4 calls can be completed from the list. In order to achieve this desired percentage rate various methods of manipulating the number of listings stored on past requested listing table 92 may be utilized. For example, as discussed above the storage delay of 90 days may be adjusted up to 120 days or down to 45 days until an appropriate number of listings are stored on past requested listing table 92.

Another method to manage the listings of past requested listing table 92 may be to adjust the storage times based on the categories of the stored listings. For example, listings on the category of hotels and airlines may be stored for only 30 days under the theory that these numbers will not be contacted again for a long time, whereas personal contact listings may be stored for 180 days because they are more frequently requested.

Yet another possible method of reaching the desired 20% completion mark is to set a maximum or minimum number of listings to be stored on past requested listing table 92.

In the case of a minimum, system 2 may add listings to past requested listing table 92 when the table is low on listings by methods such as adding additional nearby movie theaters when a first movie theater is requested in attempt to predict possible listings. Alternatively, in the case of maximums, as the number of listings on past requested listing table 92 reaches a higher number certain listings in categories such as hotels and airlines may be dropped early (before their storage time period has expired) in order to maintain the efficiency of past requested table 92.

In any event a goal of past requested listing table 92 is to decrease the amount of time necessary to retrieve the desired listings. To this end, system 2 attempts to maintain a number of listings on past requested listing table 92 such that, for example, 20% of a requested listing by requester 4 may be connected to by operator terminal 20 via table 92.

If too many listing are contained on past requested listing table 92 the time for operator terminal 20 to search through all of the listings on table 92 would defeat the purpose of having the table in the first place. If too few listings are maintained on table 92 the need to continuously search through the full database 18 (to retrieve the listings requested not contained on table 92) would also reduce the retrieval times. As such an optimum number or percentage of requests to be retrieved from past requested listing table 92 is required to achieve the desired goal of reduced listing retrieval time.

However, it should be noted that the desired percentage of 20% of the requested listings to be retrieved from past requested listing table 92 is intended only as an example and in no way limits the scope of the present invention. For example, the percentage can be adjusted up or down depending on the consistency or inconsistency in requests from that particular requester 4 as explained hereafter.

For example, if requester 4 frequently requests listings from a small group of listings the target percentage of calls to be completed from information contained on past requested listing table 92 can be adjusted upwardly to 30% or 40% by utilizing the parameters discussed above so as to further increase the efficiency for the request retrieval times. Alternatively, if requester 4 is frequently requesting random listings the target percentage may be lowered to 10-15%, again adjusting the parameters discussed above, so that past requested listing table 92 does not become cluttered with too many extraneous listings. The focus of reduction the retrieval times for listings requested by a requester 4 is always the determining factor in adjusting the parameters of past requested listing table 92.

In any event, it should be noted that all of the parameters discussed above for the settings for past requested listing table 92 described above are intended only as example of possible settings used by system and are in now way intended to limit the scope of the present invention. Any such parameters may be used alone or in combination for past requested listing table 92 such that the result is an increase in efficiency in retrieving listings requested by a requester 4 who contacts system 2 frequently.

The information contained in the fields of past requested listing table 92 can be organized in many different variations. For example, the listing requested field may include a separate entry for each time a request was made or, alternatively, it may maintain a single entry for each requested listing and tabulate the number of times that the listing was requested in the counter field.

In one embodiment of the present invention, as illustrated in FIG. 6, past requested listing table 92 maintains a category field for storing the category of retrieved listings. For example, if a requester 4 calls for a restaurant listing the entry will be stored in past requested listing table 92 and the category field will hold a restaurant notation for that entry. Likewise, if requester 4 requests a gas station, a gas station or general services notation will be entered next to the listing in the category field.

The categories filed designations may include but are not limited to recreational, movies, restaurants, commercial stores, 1-800 numbers, airlines, hotels, taxis and personal numbers. This list is intended only as an example of possible methods by which category information may be designated and is in no way intended to limit the scope of the present invention. Any category designation used to populate the category field of past requested listing table 92 is within the contemplated of the present invention.

A category ranking field is also provided in past requested listing table 92 such that for each listing having a particular category designation stored in the category filed, a corresponding category rank is attributed to that listing. For example, if a particular requester 4 had requested three different restaurant listings; the first restaurant 4 times, the second restaurant 3 times and the third restaurant 1 time, then they would be ranked in their category ranks one, two and three respectively. This information for rank can be generated by system 2 using the combination of information from the category and counter fields or it can be generated independently using other criterion.

In one embodiment of the present invention, as illustrated in FIG. 6A, a top ranked requests sub-table 94 is provided, configured to organize listings based on the information contained in the category field and the category rank field. Top ranked listing sub-table 94 may contain several fields based on categories of requests stored in past requested listing table 92 such as those discussed above.

For example, top ranked request table 94 may have a restaurants field, a personal contacts field, a 1-800 number filed and any other category that is frequently requested by a particular requester 4. Each of the fields in table 94 maintains listings of the top ranked listings for each category from listing table 92, further facilitating the retrieval of listings by operator terminal 20.

For example, the restaurant field of top ranked request table 94 lists the top five requested restaurant listings from past requested listing table 92 as identified by the category rank field. Likewise, the personal contacts field of topped ranked request table 94 lists the top five requested personal listings from past requested listing table 92 and so on for each of the categories. This number of ranked category listings stored in the various fields of top ranked request table 94 list is intended only as an example of possible methods and amounts of listings of category information that may be used to improve the listing retrieval time of system 2 and is in no way intended to limit the scope of the present invention. Any number of listings or type of categories used in top ranked request table 94 is contemplated by the present invention.

It should also be noted that topped ranked listing table 94 may be manifest in separate tables as illustrated in FIG. 6A, however this is intended only as one possible method improving listing retrieval time using the rankings of categories. For example, another means for utilizing the category rankings field information from past requested listing table 92 is to highlight the topped ranked listings for each category directly in past requested listing table 92 so as to draw attention to them at operator terminal 20 enhancing the listing retrieval time (not pictured). Any similar method that operates by drawing attention to the top ranked requested listings for each category is within the contemplation of the present invention.

If all requests are stored, the time and date of each request is stored for each request. If one entry for each listing is stored, the time and date of the last request for that listing could be stored. It should be noted that a large number of combinations for storing information in the past requested listing table 92 are available to the operator of system 2 which are too numerous to discuss in detail. For illustration purposes, the description used to illustrate the embodiments of system 2 show past requested listing table 92 maintaining a single entry for each listing and an entry in the counter field for each time the request was made.

After the system determines that a requester 4 is a repeat caller and system 2 searches database 18 for the appropriate past requested listing table 92 the information is placed on the screen of operator terminal 20 as will be discussed in more detail below in the operation section.

Both past requested listing table 92 and top ranked listing table 94 need to be updated and repopulated on frequent basis using information collected from the other components of system 2. Past requested listing table 92 and topped ranked request table 94 can be repopulated daily, hourly or in real-time.

The selection of rate for repopulation may be determined for maximum efficiency in system from a systems operation perspective or as determined by a sample of necessary update times to properly function a list for a given requester 4 or possibly a combination of both.

In the event table 92 is maintained in a server for wireless carriers 26 to be resent to the wireless devices of requester 4 as discussed above, then table 92 may be updated accordingly. For example, the server for service provider 26 may be updated as discussed above on daily, hourly or real time basis and the list as manifest on the wireless device of requester 4 may be updated when requester 4 turns off/on their wireless device or some other similar available time frame. The wireless device, in that event, stores a corresponding copy of table 92. The wireless device user can then retrieve a listing without making a call for a directory assistance. If the requested listing is not present in the copied table 92, the wireless device user will then call the directory assistance. In that event, the directory assistance may not search past requested listing table 92, based on the assumption that the requester has already attempted to retrieve the number from the copy of the table stored in the wireless device.

In accordance with one embodiment of the invention, past requested listing table 92 may be updated manually by requester 4 by directly accessing system 2 via an interface such as a web site (HTTP), SMS or WAP interfaces or any other interfaces using compatible protocols.

In operation various billing options for system 2 can be utilized in connection with the maintenance and operation of past requested listing table 92 as stored in billing database 14. Such billing options may include but are not limited to, charging for maintaining a past requested listing table 92, charging for making a connection from past requested listing table 92, charging additional fees based on the rate of updating the table 92, charges based on expanded content for table 92 and charges for maintaining the service to be operated from the wireless device of requester 4 through service provider 26.

It should be noted that this list is intended only as an example of possible billing arrangements for system 2 related to past requested listing table 92 and is in no way intended to limit the scope of the present invention. Any billing arrangement related to past requested listing table or combination of past requested listing table 92 and other features of system 2 are within the contemplation of the present invention.

In another embodiment, the information contained on past requested listing table 92 and top-ranked sub-listing table 94 may be used by system 2 to target specific requesters 4 with promotions. Such promotions may be for other services offered by system 2 or the promotions may be collaborative promotions with third parties.

As noted above past requested listing table 92 contains complete usage charts for each requester 4, and in particular for requesters 4 who have previously used the system, either frequently or sporadically. Such data as contained within both past requested listing table 92 and top-ranked sub table 94 may be utilized by system 2 to designate particular "types" of users for targeting of the promotions to either those most likely to be receptive to them based on past behavior or to entice infrequent but steady users to increase their usage.

The promotions offered by system 2 may include but are not limited to: 1) free ring tones in exchange for more usage; 2) unlimited/set limit calls to system 2 for a prearranged fee; 3) SMS bundle (SMS access to DA platform, with possible reduced rates); 4) Roadside rescue (3rd party towing services, etc. . . . ); and 5) paid advertiser search results targeted to particular requesters 4, such as special offers from paid advertisers when their listing is requested by a certain demographic/geographic caller.

For example, if system 2 desires to increase the general usage of continuous low-volume (once every month or two) requesters 4, system 2 may parse past requested listing table 92 for requesters 4 where the time and date field indicates one call to system 2 per month or so. Then when requesters 4 having such a call history contact system 2 again, they can be identified using the MIN or ANI (Automatic Number Identifier) using originating phone number field of incoming call record 15 and, either before or after the directory portion of the call is conducted they may be prompted with a promotional offer as follows:

"We are offering a promotion of a free ring tone download after five calls to our service (system 2). Would you like to enroll?" If the requester 4 accepts system 2 may follow up with: "Thank you for choosing our service (system 2). You will receive instructions for receiving your ring tone after four more calls."

In another example, a heavy volume requester, as identified using past requested listing table 92 may be targeted for an offer for a flat fee usage: "Would you be interested in receiving unlimited standard directory assistance calls to our system (system 2) for 7.99$ per month?"

In another example, system 2 may target even one time requesters 4 based on the listings they requested. For example, if a requester 4 has requested a listing from the category of "towing" or "tow truck services" system 2 may envision that these people are without a roadside assistance program. In such an event, when a third party roadside assistance (or system 2 run roadside assistance system) desires, a past requester 4 who re-contacts system 2, and in the past has requested a listing in the "towing" category may be prompted with the promotion: "Our records show that in the past you requested the services of a towing company. We now offer roadside assistance services for 3.99 per month. Are you interested in this service."

In yet another example, frequent requesters 4 for certain categories, such as "food/delivery" may be targeted for cross promotions with certain listing advertisers including take-out food establishments. Here, a third party food establishment may pay system 2 such that when a requester 4 contacts system 2, and they are identified using past requested listing table 92 and top-ranked category sub-table 94 as frequent requesters in the category of "food/delivery" that they be prompted with their own promotion.

A sample interaction may include a requester 4, who has called for "food delivery" category listings ten times in the past month, accessing system 2 for directory services. Regardless of the desired listing, system 2 may additionally prompt requester 4 with "XYZ pizza is offering 6.99$ large pizza and 2 liter to users of our service (system 2). Would you be interested in this deal?"

The full number of promotions offered by system 2 in the above manner are too numerous to described in detail. Any similar promotion that is targeted to a particular requester 4, or class of requesters 4 based on data obtained from the prior usage of the system, are within the contemplation of the present invention.

To facilitate a personal data field 95 and current promotion field 97 may be added to past requested listing table 92 as shown in FIG. 6. Personal data field 95 includes data such as sex, age, name, geographic location (primary), occupation etc. . . . . Such information may be supplied directly by frequent requesters 4 or of may be obtained from third parties (ie. the requester's carrier/service provider). Personal data field 95 may be used by system 2 to further target promotional deals to specific demographics/geographic locations. For example, a desired promotion deal for a pub/bar may not only be based on the above outlined criteria (past search requests) but also, further limited to male callers under 30 in the New York City Area.

Current promotion field 97 is used by system 2 to track current promotions that have already been accepted by requester 4. For example, if a requester 4 accepts the deal for a free ring tone after five calls to system 2, then current promotional field may be used to track how many calls they have made to system 2 before they are provided with the promotion reward. Current promotion field 97 may be further used as a propensity field in and of itself, whereby system 2 targets promotions to requesters 4 that have previously accepted earlier promotions.

It is understood that the above described target promotions based on data derived from past requested listing table 92 is exemplary in nature an not intended to limit the scope of the invention.

In another embodiment, Closing prompt module 27 provides the closing prompt identification data that will be included in a defined field such as closing prompt code field 58 of the call completion data packet 50 as shown in FIG. 5. As mentioned, call completion data packet 50 prompts switch 12 with a command to activate the appropriate closing prompt. Closing prompt module 27 functions in conjunction with agent application 19 to generate a call completion data packet 50 as more fully described below in reference to FIG. 5. Call completion data packet 50 presents information to switch 12 to generate a closing prompt based on closing prompt code field 58 of the call completion data packet 50, which is recognized by switch 12. Closing prompt module 27 can either exist as a physically separate unit or it can exist as a functional module of agent application 19 software.

While one embodiment of the invention has been described above, the invention contemplates that call completion data packet 50 can be used by any combination of hardware and software such as: an ACD, a PBX, a standalone VRU (Voice Response Unit)/ASR (Advanced Speech Recognition), application software and the like, to generate the closing prompt based on the closing prompt code field 58 in call completion data packet 50.

Figure 4:
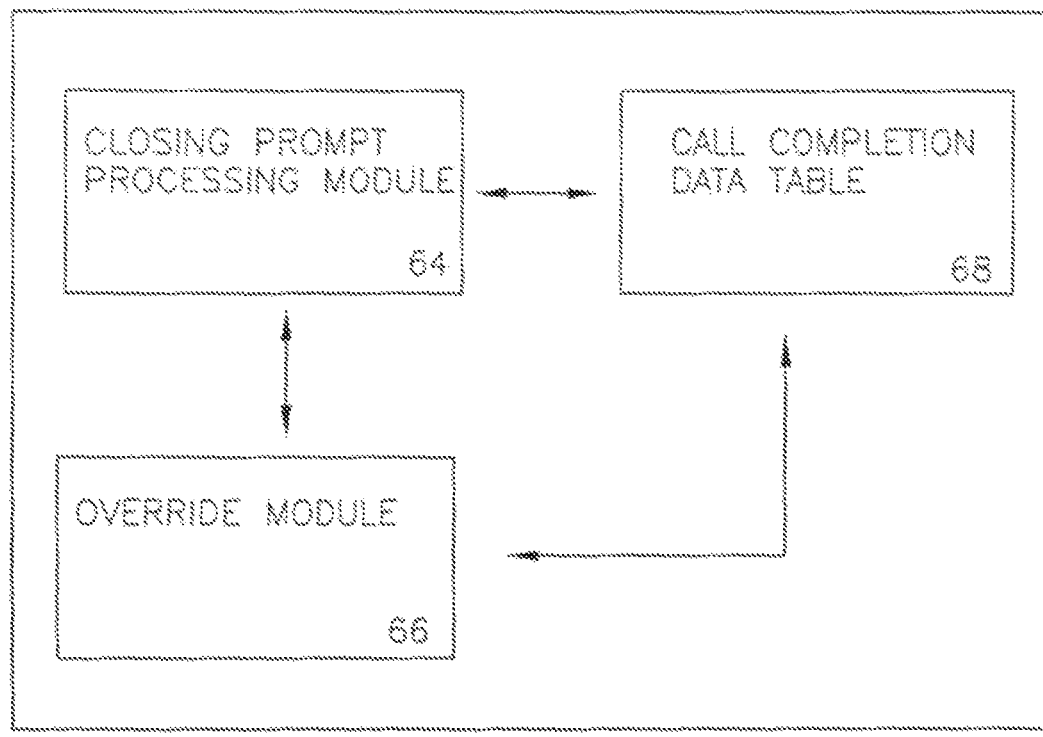
FIG. 4 is a diagram of a closing prompt module in accordance with one embodiment.

As illustrated in FIG. 4, closing prompt module 27 is comprised of a closing prompt processing module 64, override module 66 and a call completion data table 68. Call completion data table 68 can either be a separate table within closing prompt module 27 or it can exist as software that is found in closing prompt processing module 64. In another embodiment of the current invention, closing prompt processing module 64 and override module 66 can reside on Switch 12 or any combination of hardware and software such as: an ACD, a PBX, a standalone VRU/ASR, application software and the like.

In the case of new requesters 4, closing prompt module 27 may generate a closing prompt to invite requester 4 to set up a subscriber 6 listing (to be stored as a listing in system 2). This allows system 2 to accumulate a more complete subscriber 6 database. Closing prompt module 27 may further be utilized to implement the targeted promotions that are discussed in detail above, if the promotions are handled in an automated manner rather than directly by (live) operator terminal 20.

Agent application 19 software then creates a call completion data packet 50. Alternatively, closing prompt module 27 or some other application could create call completion data packet 50; however, for the purposes of this discussion agent application 19 will be forming call completion data packet 50. As illustrated in FIG. 9, call completion data packet 50 is comprised of multiple data fields. This can include but is not limited to the originating phone number of requester field 54, the device identification number information field 56, closing prompt code field 58 and pre-announcement field 59.

Call completion data packet 50 is formed by agent application 19 at operator terminal 20 using information from Incoming call Information Record 15, listings in database 18, and closing prompt module 27. This information is then organized and used to populate the fields of call completion data packet 50.

The originating phone number field 54 is the originating phone number of requester 4. The device identification number information field 56 is the requested listing of subscriber 6. This information is provided to operator terminal 20 by the retrieved listing from listing database 18. The device identification information field identifies the proper destination for the completed call. This information is used to properly connect requester 4 to device 6. As discussed below the proper listing can be retrieved by operator terminal 20 by a search or it can be entered directly from information provided from past requested listing table 92 or top ranked listing sub-table 94 in the case of a repeated requests.

Closing prompt code field 58 of call completion data packet 50 contains instructions on which closing prompt to retrieve, use and play for requester 4. As discussed above, for new requesters 4 closing prompt field 58 of call completion data packet 50 may contain instructions for a closing prompt directed to inviting that requester to submit their information to system 2 to create a subscriber 6 record. Additionally, if the promotions are handled as automated promotions as noted above, then the coding for such pre-recorded promotions would also be included in closing prompt field 58.

Pre-announcement field 59 of call completion data packet 50 denotes to the Voice Response Unit (VRU) whether or not the pre-announcement feature is activated. If the pre-announcement feature is activated the VRU will announce requester 4's identity to device 6 by either voice or text message so that wireless apparatus 6 can determine whether or not to accept the call.

When combined, the originating phone number of requester field 54, the device identification information field 56, the closing prompt code field 58, and the pre-announcement field 59 contain all of the information needed to initiate and complete the call, play the appropriate closing and pre-announcement.

Wide Area Network (WAN) 25 is configured to couple all operator terminals 20 to system 2 and 2'. This includes connections between geographic locations, such that operator terminals 20 located at a call center can connect with switches 12 at other remote locations. As noted earlier and to be discussed in more detail below, because primary call center 16 may route calls to remote operator terminals 20' it is necessary that those operator terminals 20' be able to communicate back to the originating switch 12 in order to connect to the proper call. WAN 25 is configured to relay call completion data packet 50 to the appropriate switch 12 in order to complete requester 4's call. A more complete description of the function of WAN 25 within system 2 is discussed below.

Agent application 19, as supported by one of the operator terminals 20, communicates via operator terminals 20 to any one of the switches 12 with the combination of systems 2, 2' etc. via Wide Area Network 25 (WAN). WAN 25 allows customer service representatives at operator terminals 20 to transmit a call completion data packet 50 from operator terminals 20 to any one of switches 12. In the event that agent application 19 is unable to successfully pass call completion data packet 50 due to any number of reasons including but not limited to the unavailability of WAN 25 or the rejection of call completion data packet 50, agent application 19 can initiate call completion using in-band signaling such a DTMF. This allows agent application 19 to put the caller on soft hold and pass the destination digits to switch 12 via the same trunk. Switch 12 then accepts the digits and releases the call to call Center 16 and initiates call completion as described hereinafter.

As part of the call completion process, switch 12 has the ability to select the optimal trunk group to be used for the completion of requester 4 to subscriber 6. For example, if switch 12 has a direct connection to the service provider 26 of subscriber 6, the completion of this call would be implemented over this link.

In the case where switch 12 did not have a direct connection to service provider 26 of subscriber 6, the completion of this call would be via PSTN 10. This allows switch 12 to select the most cost effective means of delivering the call to subscriber 6. This selection of the outbound trunk group may be determined by call completion table 17 (as shown in FIG. 1) based on information contained in call completion data packet 50. For example, the NPA.nxx of the number in the device identification information field 56 in call completion data packet 50 can be used to indicate service provider 26 for that listing. This information is then used to determine whether a direct connection exists from switch 12 to that service provider 26. If such a direct connection exists, then the first choice route for this call would be via that link. In the event that such direct connection is not available or does not exist, an alternate route such as a connection to the PSTN 10 could be used.

Figure 7:
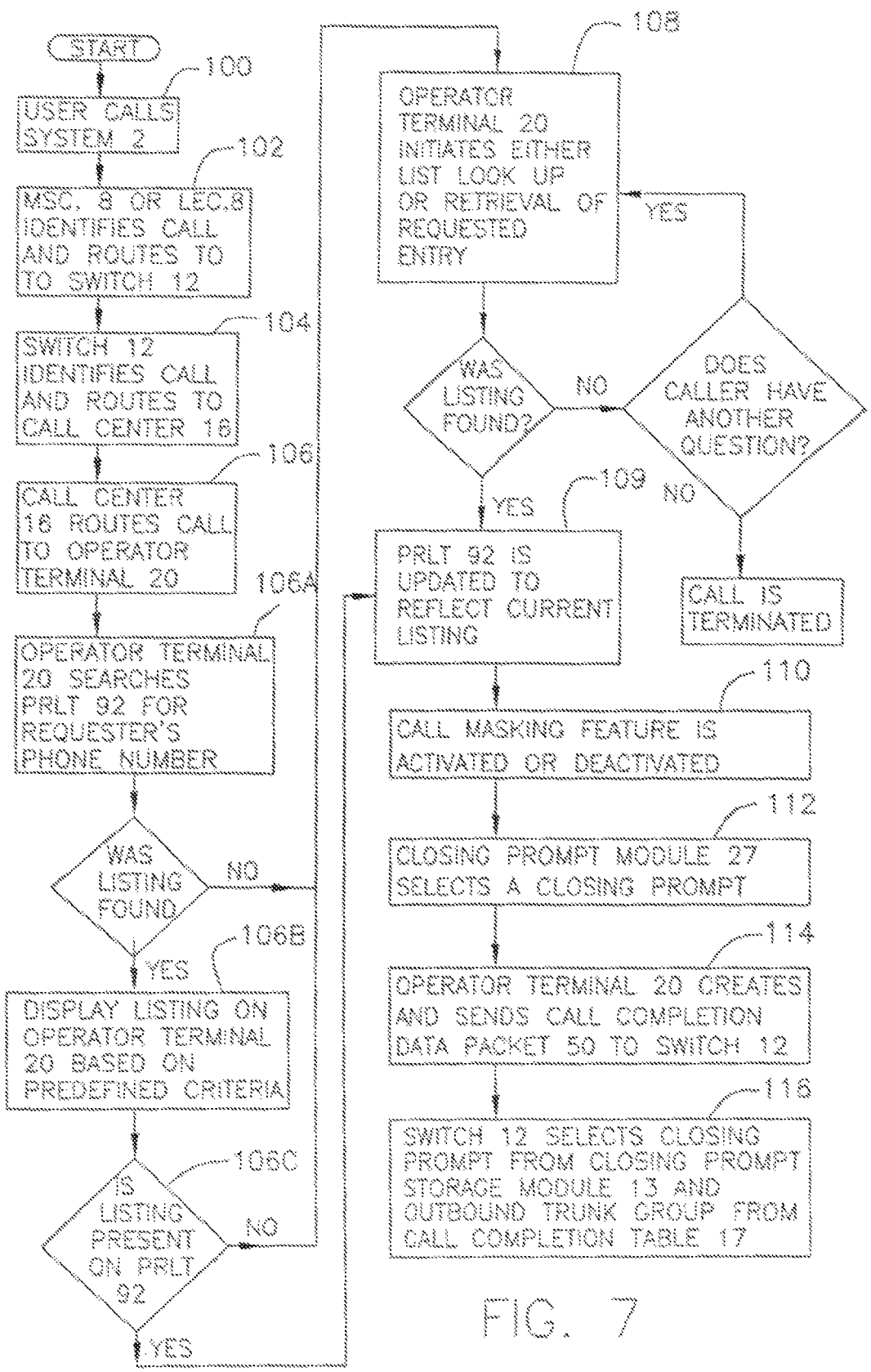
FIG. 7 is a flow chart demonstrating the operation of the system in accordance with one embodiment.

As illustrated in the flow diagram of FIG. 7, initially, at step 100, requester 4 calls system 2. The method for accessing system 2 can be via any known dialing pattern such as an "800" number, an NPA.nxx.xxxx number or NPA-555-xxxx, but also can be a shortened information-like number, such as "411," "555," "#555," etc. Preferably, access to system 2 is arranged such that the access number dialed by requester 4 is available nationwide such that requester 4 need not be concerned with individual access numbers depending on their location, or whether they are accessing system 2 via a wireless device or a wireline device.

It should be noted that if past requested listing table 92 or top ranked listing table 94 is stored in server for communication to service providers 26 which in turn is communicated to the wireless device of requester 4 as discussed above, and the requester wishes to place a call to one of the listing contained within, then the call may be dialed directly from the wireless device, directly through wireless carrier 26. The call can also be processed through switch 12 of system 2 based on the configuration of such arrangements for table 92, bypassing any operator terminal 20 directory assistance listing retrieval allowing the call to proceed directly to call completion.

At step 102, Mobile Switching Center (MSC) 8 recognizes the pattern dialed by requester 4 as belonging to system 2 (i.e., a request for communication assistance) and routes the call to switch 12 along with the originating phone number of requester 4. Switch 12 tracks call detail information upon receiving the call from MSC 8.

An additional feature of switch 12 is its ability to recognize and translate dial number and ANI strings allowing system 2 to provide agent application services to multiple customers. Upon dialing the appropriate number, MSC 8, is configured to recognize that the dialed number string belongs to the communication assistance system and method, and routes the inbound call to switch 12. If necessary, prior to routing the call to switch 12, MSC 8 may translate the user's dial string (for example #555) to a digit sequence recognized by system 2.

This translation allows different service carriers to access the service provided by the present invention using either a universal access number or different user dial strings. For example, in the event that two carriers decide to use different dial strings (i.e. cellular telephone carrier A may support access to system 2 by dial string *5 while cellular carrier B may access the service using the dial string 411), each carrier's Mobile Switching Center (MSC) 8 may or may not select to translate this dial string before routing the call to switch 12. Upon receiving the inbound call, switch 12 may further translate the MSC 8 dial string and route the call to primary call center 16. The number sent by switch 12 allows system 2 to identify the particular MSC 8 from which the dial string was received along with the actual MSC dial string so that elements of system 2 can determine what service is desired, and where the inbound call originated. It is also contemplated by this invention that calls may originate from a wireline carrier and/or VoIP carrier as shown in FIG. 1.

For example, switch 12 might translate Mobiles Switching Center (MSC) 8 dial string 411 to any four-digit number (this string length is for example only and can be modified) such as 9605. This four-digit string is used to populate the number dialed by requester field 60A in call completion data table 68. The translated digit string will be referred to as the Direct Inbound Dial (DID) number. Each switch 12 can have multiple DID numbers to identify requester 4's request for different services and their calling location.

An additional feature available using this technology is to provide a separate dial string as an indicator of preferred language information to system 2. For example, if a dial string such as NPA.555.1818™ is used, switch 12, after translating the MSC dial string, will automatically send a Spanish language preference indicator in Incoming call Information Record 15 so that the primary call center 16 will route the call to an appropriate operator terminal 20, such as a Spanish speaking operator. Advantageously, Spanish speaking operators may be located remotely from system 2 and calls to be handled by them may be routed via call center 16 to a remote call center 16' as described above in reference with FIGS. 1-3.

It should be noted that the above example of call signaling methodology is intended only as an example of call routing and requester 4 identification and is not intended to limit the scope of the present invention. Any such signaling methodology protocol which is capable of transmitting the call between the MSC 8 and switch 12 is within the contemplation of the present invention.

At step 104, switch 12 routes the call to primary call center 16. To perform this task, switch 12 creates incoming call information record 15, as shown in FIG. 2, with the pertinent information as described in more detail above, and selects a direct trunk to call center 16. The configuration being used to carry the call between switch 12 and primary call center 16 preferably is a release link trunk configuration, discussed above in detail. While not discussed here, it is contemplated that any trunking and/or signaling configuration can be used to route the call from switch 12 to call center 16. It is also contemplated by this invention that switch 12 may connect this call to call center 16 via Public Switched Telephone Network PSTN 10 (i.e. using an 800 number or a directly dialed number).

Next, at step 106, upon receiving the call from requester 4, primary call center 16 notifies an available operator terminal 20 with the appropriate skills, if necessary, that an inbound request has arrived and routes the call there. Upon establishing a link between requester 4 and operator terminal 20, primary call center 16 establishes a voice and communications link from the caller to the customer service representative. The two-way voice communication is routed directly from requester 4 through primary call center 16 to operator terminal 20, having an attached telephonic communication means. The data communication, which may include any information contained in incoming call information record 15 (i.e. the number dialed by requester 4 (the DID), the preferred language code, the originating phone number of the requester and the requester service provider field) is transmitted to the primary call center 16 to operator terminal 20 via Computer Telephony Interface (CTI) 29. CTI 29, deployed between primary call center 16 and operator terminals 20, is used to communicate the information necessary for the customer service representative and agent application 19 software to handle and complete the call.

Using this link, an agent asks requester 4 for information regarding the services they are requesting. Requester 4 supplies the necessary information. An example of this information may include but is not limited to: the directory listed name, the defined locality, the email address, the name, wireline phone number, license plate, etc. It is contemplated by the current invention that traditional directory assistance and enhanced directory assistance may also be provided by this system.

Next at step 106A, using information from the originating phone number field of incoming call information record 15, operator terminal 20 and agent application 19 search the caller number fields of the past requested listing table 92 to determine if this requester 4 has called in the past. If not, then the operator terminal 20 proceeds to step 108 and begins generating a new past requested listing table 92 entry for that requester.

If requester 4 is a past caller, then at step 106B, agent application 19 and operator terminal 20 display the information from past requested listing table 92 and top ranked listing sub-table 94 to the operator in some form of organization based on a predefined criteria as discussed above.

Next, at Step 106C, the operator determines if the newly requested listing is on the display information provided by the past requested listing table 92 or top ranked listing table 94. If not, the operator proceeds to step 108. If the listing is present, then the operator bypasses the searching step (108) and directly links requester 4 to the desired listing and then the system proceeds to step 109. This arrangement saves the service representative of operator terminal 20 a considerable amount of search time, leading to a better response time.

If, as discussed above, requester 4 is a first time caller or if the listing requested is not in the past requested listing table 92, then at step 108, the agent at operator terminal 20 then initiates a search of database 18. Of course, if primary call center 16 is busy or there are no available operator terminals 20, the requester 4's call can be forwarded to call Center 16' which can accommodate the requester's inquiry in the same manner as described above in step 106. If the requested listing is unavailable, the agent awaits further instruction from requester 4.

At step 109, whether the information was retrieved from past requested listing table 92 or if the listing was retrieved by the operator through a search, system 2 updates past requested listing table 92 and top ranked listing table 94 according to the system 2 update schedule. In the case of first time caller a past requested listing table 92 is generated.

It should be noted that if past requested listing table 92 and top ranked listing table 94 are stored on server for service provider 26 to be transferred directly on the wireless device of requester 4, then the updating process of the server may occur upon a similar time frame, such as daily, hourly or real-time and the list as it appears in the wireless device of requester 4 may be updated on a scheduled interval or when the wireless device is turned on and reconnected to its service provider 26 as discussed previously. Service provider 26 transmits the corresponding copy of table 92 to the wireless device assigned by requester 4 during those scheduled intervals so that the wireless device would maintain an up-to-date list of the past requested listings. The updated list can also be transmitted to the wireless device or in accordance with a regularly scheduled maintenance connection directly with system 2 such as through an Internet connection.

If requester 4 has been targeted to receive a promotion as discussed in detail above, and if the promotion is to be offered by a live agent, then while operator terminal 20 is handling the directory assistance request, either before or after steps 106-108, the promotion may be read to requester 4, and, if accepted it can be noted in current promotion field 97 of past requested listing table 92.

Next, at step 110, the listing for subscriber 6 is reviewed to determine if the number requested is unlisted or if it is masked to prevent requester 4 from receiving the actual number. The records associated with device 6 in databases such as 18 and 18', as listed in the listing table are provided with a connect field, having a sub-table 70 that indicates to operator terminal 20 whether or not a customer service representative is permitted to connect the call and, if so, disclose the number to requester 4. This ensures unlisted numbers remain unreachable and that the number of device 6 remains confidential if the corresponding subscriber so wishes.

During operation, agent application 19 software reviews sub-table 70 to check if the number is unlisted. If so, the customer service representative informs requester 4 of this and awaits further instructions. If the number is listed, then agent application 19 checks to see if the number is masked. This is the feature that is "on" or "off" at the request of the subscriber 6; however preferentially, the default is set to masked. If the number is masked, the call is connected without requester 4 ever seeing or hearing the number. If the number is not masked, requester 4 receives the number and is offered the service of automatic dial or other such comparable service. Of course, it is understood that the above described operation and method are easily implemented in this software arrangement or any other software arrangements known to those familiar with the art. It is also contemplated by this invention that database 18 may be stored in an encrypted format to protect it from intrusion, hacking or other forms of unauthorized access or use.

Alternatively, for an even more secure listing for device 6, the phone number associated with device 6 is not displayed to the customer service representative at operator terminal 20. Although system 2 will have the information it will not be displayed to the customer service representative. In this case, operator terminal 20 and switch 12, communicating through call completion data packet 50 and Wide Area Network (WAN) 25, complete the call while maintaining the secrecy of the phone number throughout.

Next, at step 112, closing prompt module 27 decides on an appropriate closing prompt, based on the criteria described above. Such closing prompt selection may include the implementation of a pre-recorded promotion to requester 4 as noted above. The closing prompt is may provide either a special or general announcement or may be selected or modified by override module 66 or selected by logic contained in closing prompt processor module 64 based on subscriber 6 and requester 4 information found in call completion data table 68.

It should be noted that subscriber 6 listings stored on past requested listing table 92 will be listed according to the masking feature criteria saved in their listing table in the connect field. Thus, if a requester 4 requests a subscriber 6 listing in which the connect field of that listing indicates that the listing is masked then not only will that request be connected in accordance with the masking instructions but also, when the listing is stored to that requester's past requested listing table 92, the listing will appear in a masked format.

In the case of a new requester 4, as discovered in step 106A, closing prompt module 27 may select a prompt inviting requester 4 to contact system 2 and enter their information into a listing a listing stored in database 18.

A code or multiple codes for the prompt or prompts is then used by closing prompt module 27 to populate closing prompt code field 58 of call completion data packet 50 so as to determine which recorded closing prompt is to be played.

Next at step 114, agent application 19 software on operator terminal 20 constructs call completion data packet 50. Call completion data packet 50 is prepared using information from Incoming call information record 15, listing from database 18, closing prompt module 27, agent application 19 and verbal information from requester 4.

Upon completion of call completion data packet 50, operator terminal 20 transmits call completion data packet 50 to switch 12 via Wide Area Network 25. WAN 25 is connected to all switches 12 and all operator terminals 20 in system 2, such that should an operator terminal 20 be remotely located from switch 12 as a result of call routing, operator terminal 20 will be able to send the call completion data packet 50 through WAN 25, even to remotely located Switches 12. The appropriate switch 12 is identified by agent application 19, using the DID which identifies the originating switch where the requester 4's call entered system 2.

Next, at step 116, switch 12 initiates the call between requester 4 and subscriber 6. Switch 12 then begins tracking call detail information and other functions for the call completion leg. Switch 12 then uses the information in call completion data packet 50 to select the appropriate closing prompt from closing prompt storage module 13, and the appropriate outbound trunk group from call completion table 17.

Figure 8:
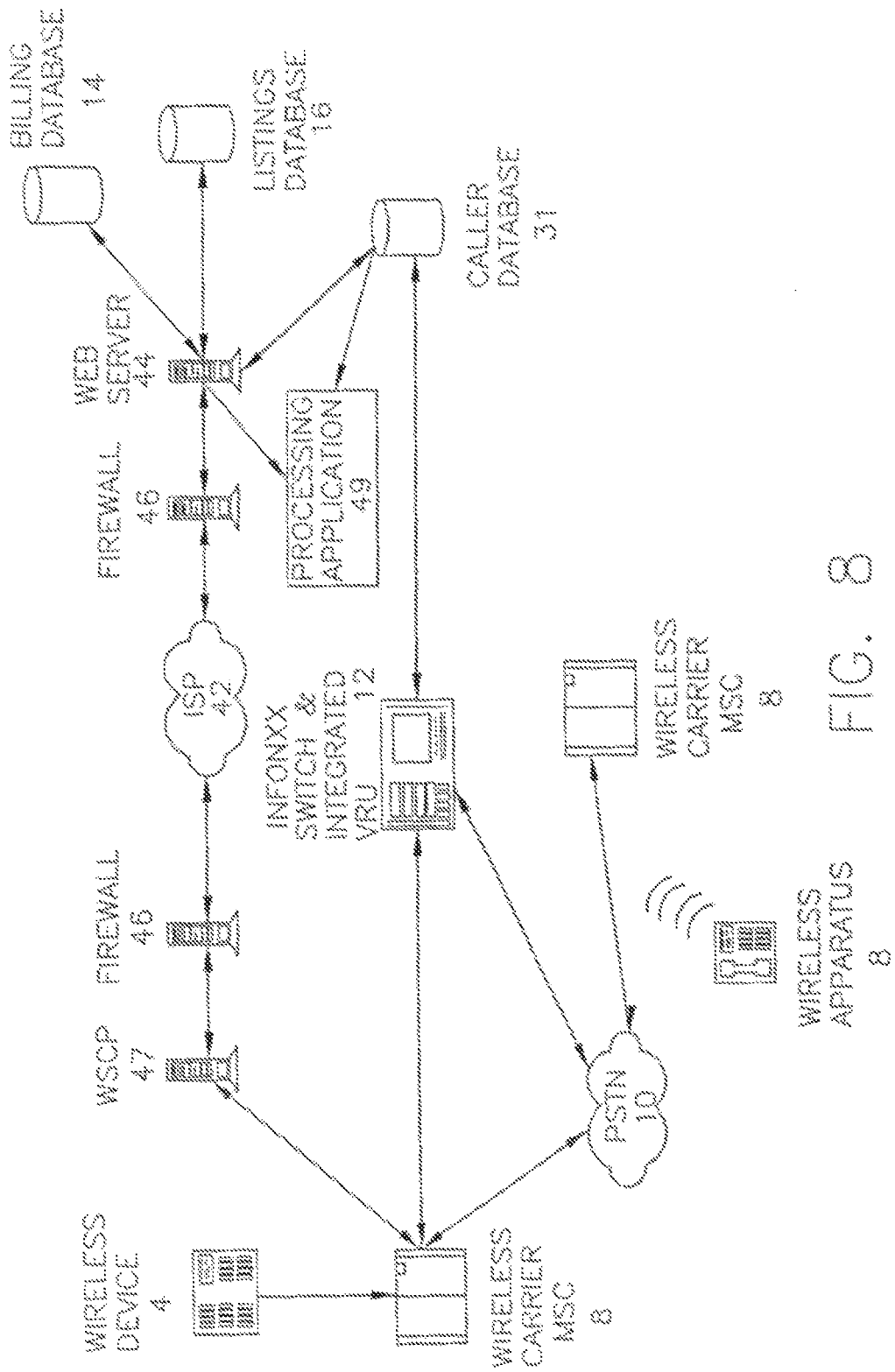
FIG. 8 is a diagram of an example of the components used to provide access to listings database 18 via a WAP (wireless application protocol) portal, in accordance with one embodiment.

Another embodiment of the invention is shown in FIG. 8 which shows a diagram of an example of the components used to provide access to listings database 18 via a data protocol included but not limited to: WAP (Wireless Application Protocol), SMS, iMode interface, for the purpose of synchronizing data contained in past requested listing table 92 with requester 4's remote wireless device. In this embodiment of the invention, the requester 4 performs a query via device 6. At MSC 8, the request is processed by WSCP (Wireless Services Control Point) 47 and interfaced through the carrier's firewall 45 to the Internet via ISP 42. The request is in turn processed through system 2's firewall 45 and passed to web server 44. On web server 44, the processing application 49 takes the information sent and structures a query that will go against the listing database 18. The listing database 18 will return the information contained in past requested listing table 92 or top ranked listing table 94 that are consistent with the request. This information will be sent back via firewall 45 to device 6. The transmitted information is then used to update the database on the device.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A communication assistance system, said system comprising:
    a database having a plurality of listings therein, each of said listings including a least one contact name and a contact information;
    a means for receiving incoming communications from a plurality of requesters seeking a listing among said plurality of listings;
    a table for storing past requested listings of said requesters, wherein said system reviews said table for storing past requested listings and, based on contents contained in said past requested listing table developing a list of requesters to target a promotion to, whereupon when a requester among said plurality of requesters who is among said list of requesters contacts said system, they are provided with said promotion.

2. The system as claimed in claim 1, wherein said means for receiving incoming communications from said plurality of requesters is a telephone switch for receiving incoming telephone calls from said requesters.

3. The system as claimed in claim 1, wherein said means for receiving incoming communications from said plurality of requesters is an electronic communication interface for receiving electronic communications from said requesters.

4. The system as claimed in claim 1, wherein said electronic interface is cable of receiving communications from said requesters in an electronic format selected from the group consisting of iMode, SMS, HTTP, WAP and IM.

5. The system as claimed in claim 1, wherein said table for storing past requested listings of said requesters, further includes additional information about past requested listings selected from the group consisting of time and date of request, number of times that listing was requested, category of said listing, ranking for that requester for said category of said listing.

6. The system as claimed in claim 5, wherein said past requested listing table further includes a personal data field that contains personal data about said requester selected from the group consisting of ex, age, name, geographic location (primary), occupation.

7. The system as claimed in claim 6, wherein said past requested listing table further includes a current promotion field which tracks current promotions previously accepted by said requester.

8. The system as claimed in claim 7, wherein said system further maintains a top requested listing sub-table that includes data regarding category preference information about said listings requested by said requester.

9. The system as claimed in claim 8, wherein said system, when developing a list of requesters to target a promotion to, is based on contents contained in one or more of said past requested listing table, said to requested listing sub-table, said personal information field, and said current promotion field.

10. The system as claimed in claim 1, wherein said promotion is read to said requester by a live customer service agent during said communication from said requester.

11. The system as claimed in claim 1, wherein said promotion is delivered to said requester as a pre-recorded message delivered in a closing prompt upon call completion.

12. The system as claimed in claim 1, wherein when a requester among said plurality of requesters, who is among said list of requesters to receive a promotion, contacts said system, said system recognizes said caller using a caller identifier.

13. The system as claimed in claim 12, wherein said caller identifier is selected from the group consisting of ANI and MIN.

14. A method for providing communication assistance, said method comprising the steps of:
    maintaining a database having a plurality of listings therein, each of said listings including a least one contact name and a contact information;
    receiving incoming communications from a plurality of requesters seeking a listing among said plurality of listings;
    storing past requested listings of said requesters in a table;
    reviewing said table for storing past requested listings;
    developing a list of requesters to target a promotion to based on contents contained in said past requested listing table; and
    provided said requester with said promotion when a requester among said plurality of requesters who is among said list of requesters contacts said system.

* * * * *

UNITED STATES PATENT AND TRADEMARK OFFICE
CERTIFICATE OF CORRECTION

PATENT NO. : 8,380,241 B2
APPLICATION NO. : 12/888727
DATED : February 19, 2013
INVENTOR(S) : McGary et al.

It is certified that error appears in the above-identified patent and that said Letters Patent is hereby corrected as shown below:

In the Claims

Claim 4, Column 21, Line 31: The word "cable" between the words "is" and "of" should read "capable".

Claim 6, Column 21, Line 44: The words "ex" between the words "of" and "," should read "sex".

Signed and Sealed this
Third Day of September, 2013

Teresa Stanek Rea
*Acting Director of the United States Patent and Trademark Office*